United States Patent
Ahmed et al.

(10) Patent No.: US 12,449,995 B2
(45) Date of Patent: Oct. 21, 2025

(54) ENABLING PERSISTENT MEMORY FOR SERVERLESS APPLICATIONS

(71) Applicant: HEWLETT PACKARD ENTERPRISE DEVELOPMENT LP, Spring, TX (US)

(72) Inventors: Faraz Ahmed, Santa Clara, CA (US); Lianjie Cao, San Jose, CA (US); Puneet Sharma, Milpitas, CA (US); Amit Samanta, Salt Lake City, UT (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 518 days.

(21) Appl. No.: 17/957,700

(22) Filed: Sep. 30, 2022

(65) Prior Publication Data
US 2024/0126460 A1   Apr. 18, 2024

(51) Int. Cl.
| | |
|---|---|
| *G06F 9/46* | (2006.01) |
| *G06F 3/06* | (2006.01) |
| *G06F 9/48* | (2006.01) |
| *G06F 9/50* | (2006.01) |

(52) U.S. Cl.
CPC .......... *G06F 3/0638* (2013.01); *G06F 3/0665* (2013.01); *G06F 9/4843* (2013.01); *G06F 9/5016* (2013.01); *G06F 3/0604* (2013.01); *G06F 3/0679* (2013.01); *G06F 2209/501* (2013.01); *G06F 2209/5014* (2013.01)

(58) Field of Classification Search
CPC ................. G06F 9/4843; G06F 9/5016; G06F 2209/501; G06F 2209/5014; G06F 3/0638; G06F 3/0665; G06F 3/0604; G06F 3/0679
See application file for complete search history.

(56) References Cited

U.S. PATENT DOCUMENTS

| | | | |
|---|---|---|---|
| 8,839,255 B2 * | 9/2014 | Memik | ................. G06F 9/4881 711/151 |
| 10,853,183 B2 | 12/2020 | Natanzon et al. | |
| 11,126,431 B1 | 9/2021 | Lecler et al. | |
| 2021/0099459 A1 | 4/2021 | Zhang et al. | |

OTHER PUBLICATIONS

Zhao et al., FIRM: Fair and High-Performance Memory Control for Persistent Memory Ssytems, IEEE, 2014, pp. 153-165. (Year: 2014).*

Daase et al., Maximizing Persistent Memory Bandwidth Utilization for OLAP Workloads, In Proceedings of the 2021 International Conference on Management of Data, 2021. 13 pages.

(Continued)

*Primary Examiner* — Diem K Cao
(74) *Attorney, Agent, or Firm* — Trop, Pruner & Hu, P.C.

(57) ABSTRACT

A scheduling platform for scheduling serverless application tasks in persistent memory (PMEM) is provided. A profiler receives application requests from processes of serverless applications. The profiler categorizes the processes as persistent or non-persistent based on the application requests. A read/write batcher creates batches of the persistent requests including the read requests and write requests and assigns the batches to persistent memory banks. A scheduler creates a schedule of the batches to the persistent memory banks in a manner enabling optimization of job completion time.

20 Claims, 5 Drawing Sheets

(56) References Cited

OTHER PUBLICATIONS

Daase et al., "Maximizing Persistent Memory Bandwidth Utilization for OLAP Workloads", Jun. 20-25, 2021, 8 pages.
Gugnani et al., "Understanding the Idiosyncrasies of Real Persistent Memory", Proceedings of the VLDB Endowment, vol. 14, No. 4, 2020, pp. 626-639.
Jain et al., "Throughput Fairness Index: An Explanation", Feb. 1999, 9 pages.
Kalia et al., "Challenges and Solutions for Fast Remote Persistent Memory Access", Proceedings of the 11th ACM Symposium on Cloud Computing, SoCC '20, 2020, pp. 105-119.
Klimovic et al., "Pocket: Elastic Ephemeral Storage for Serverless Analytics", 13th USENIX Symposium on Operating Systems Design and Implementation (OSDI '18), Oct. 8-10, 2018, 19 pages.
Koutsoukos et al., "How to use Persistent Memory in your Database", 2021, 13 pages.
Mahgoub et al., "SONIC: Application-aware Data Passing for Chained Serverless Applications", USENIX Annual Technical Conference, 2021, 15 pages.
Pu et al., "Shuffling, Fast and Slow: Scalable Analytics on Serverless Infrastructure", 16th USENIX Symposium on Networked Systems Design and Implementation (NSDI '19), 2019, 15 pages.
Yang et al., "An Empirical Guide to the Behavior and Use of Scalable Persistent Memory", 18th USENIX Conference on File and Storage Technologies (FAST '20), Feb. 25-27, 2020, 15 pages.
Zhang et al., "Accelerate and scale Bigdata Analytics with Alluxio and intel® optane™ persistent memory", Intel, May 7, 2020; 13 pages.
Zhao et al., "FIRM: Fair and High-Performance Memory Control for Persistent Memory Systems", Oct. 9, 2014, 13 pages.

\* cited by examiner

ENABLING PERSISTENT MEMORY FOR SERVERLESS APPLICATIONS

INTRODUCTION

Serverless architecture provides an avenue for building and running applications and services without the need for infrastructure management. Within a serverless architecture, different applications share underlying computing, network, and storage resources. Serverless applications include multiple function chains. Each function chain has different stages and each stage utilizes intermediate data from a previous stage. Application performance can suffer due to bottlenecks in accessing memory structures related to processing of this intermediate data. In recent years, the serverless paradigm has flourished as the application developers need not worry about the underlying infrastructure, resource allocation policies, and scalability issues. The increase in data size and complexity of serverless functions and the heterogeneity of the storage infrastructure have created new challenges for large-scale serverless platforms.

Some existing systems store the data in Virtual Machines (VMs) for functions with few dependencies and use remote storage for functions with more dependencies. While executing the above-described functions, the chains can be divided into small tasks to provide better parallelism. However, data transfer can become a bottleneck when running many small tasks in multi-stage serverless analytics jobs due to an increase in disk I/O operations as data volume increases. Thus, other efforts have addressed bottlenecks occurring during processing for serverless applications by using fast and slow storage to deal with such bottlenecks.

BRIEF DESCRIPTION OF THE DRAWINGS

The present disclosure can be understood from the following detailed description, either alone or together with the accompanying drawings. The drawings are included to provide a further understanding of the present disclosure and are incorporated in and constitute a part of this specification. The drawings illustrate one or more examples of the present teachings and together with the description explain certain principles and operation. In the drawings.

DETAILED DESCRIPTION

Figure 1:
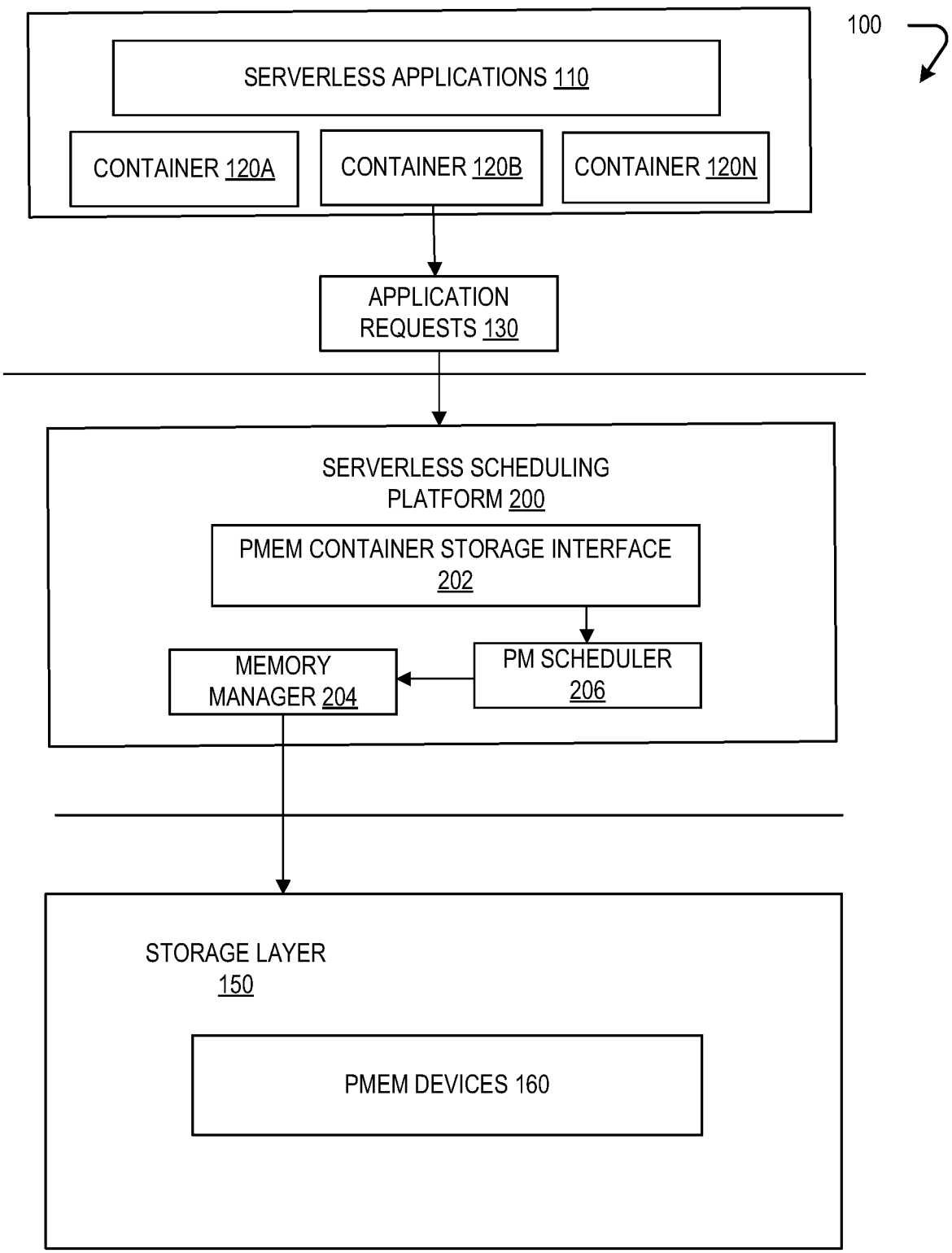
FIG. 1 is a block diagram illustrating an operating environment for implementing a serverless scheduling platform.

Serverless architecture is an approach to software design that allows developers to build and run services without having to manage the underlying infrastructure. Developers can write and deploy code, while a cloud provider provisions servers to run their applications, databases, and storage systems at any scale. Serverless architecture differs from other cloud computing models in that the cloud provider is responsible for managing both the cloud infrastructure and the scaling of applications. Serverless applications may be deployed in containers that automatically launch on demand when called.

The term "persistent memory" (PMEM) refers to an apparatus that stores data persistently such that stored data structures can continue to be accessed using memory instructions or memory APIs even after the end of the process that created or last modified them and the data remains stored even after the PMEM is powered off. PMEM has certain characteristics similar to dynamic random-access memory (DRAM). For example, PMEM may use memory accessing instructions (as opposed to using traditional block-based storage access protocols) and may have relatively fast accessing times (e.g., somewhere between the speeds of DRAM and solid state disks (SSDs)), but PMEM also shares some characteristic with SSDs and hard disk drives (HDDs), notably that the data is stored persistently. PMEM is a non-volatile, byte addressable, low latency memory with densities greater than or equal to DRAM. PMEM can be embodied in a solid-state high-performance byte-addressable memory device that resides on the memory bus. Being on the memory bus allows PMEM to have DRAM-like access to data, and thus similar speed and latency to DRAM but further with nonvolatility. PMEM is known to provide low latency and high throughput compared to more traditional storage devices. NVDIMM (nonvolatile dual in-line memory module) and Intel 3D XPoint DIMMs (also known as Optane DC persistent memory modules (DCPMM)) are two examples of persistent memory technologies. PMEM is beneficial because it can dramatically increase system performance and enable a fundamental change in computing architecture. Applications, middleware, and operating systems are no longer bound by file system overhead in order to run persistent transactions.

Applications running on the serverless architecture form a function chain having various stages, such that each stage utilizes intermediate data of a previous stage. The continual need for access to intermediate data can create a bottleneck. The output of each function needs to be stored in a memory structure so that a subsequent function can consume that output. This can often create a bottleneck, particularly in traditional storage mediums.

Thus, examples described herein aim to place intermediate data in a faster storage medium (i.e., PMEM) or a combination of PMEM and other storage media, in order to accelerate the serverless function chains and minimize the time for reading and writing of outputs. Though the PMEM provides lower latency and a cost tradeoff over other memory technologies (i.e., DRAM, solid state disk (SSD) and hard disk drive (HDD)), the performance of PMEM deteriorates when a threshold number of write threads operate at the same time. As the number of write threads increases, the bandwidth drops. Various techniques have evolved for minimizing the impact of this deficiency. However, these techniques have not addressed the particular needs of serverless applications.

Accordingly, a need exists for intelligent I/O scheduler that can schedule read and write requests of serverless application processes so that the job completion time of PMEM decreases while maintaining the PMEM performance for write-intensive serverless applications. Thus, in examples set forth herein, methods and systems are proposed to determine an optimal balance between the number of reads and the number of writes in any given scheduling time period, while giving more preference to the reads where possible, to give overall higher throughput. An intelligent and efficient scheduler for PMEM-aware serverless applications aims to schedule I/O workloads efficiently and fairly by controlling a number of writers to PMEM in order to minimize job completion time (JCT).

Examples provided herein introduce a persistent-memory-aware scheduling system ("PM scheduling system") for optimizing job completion time when utilizing PMEM to run applications in a serverless architecture. The PM scheduling system receives I/O requests from processes of the serverless applications and profiles the processes as to whether the processes are persistent, meaning that their I/O requests are directed toward persistent memory, or non-persistent, meaning that their I/O requests are not directed toward persistent memory. In general, the I/O requests received at the level of the PM scheduling system do not explicitly indicate whether they are directed toward persistent or non-persistent memory, and thus the profiler may be configured to deduce this from any of a variety of sources. For example, information from the kernel level may be provided to the scheduling system to identify whether I/O requests are persistent or not, as this information is explicit at the kernel level. As another example, the scheduling system may consider various program clues associated with a process to deduce whether it is persistent or not, such as, for example, examining lower level kernel system calls or examining user space information at the application layer to determine task level I/O requirements including persistency and throughput, and whether an application's I/O workload requires PMEM. Once processes have been profiled as persistent or not persistent, the PM scheduling system can thereafter classify and sort received I/O requests based on the persistency state of the processes that generated them, without having to explicitly determine persistency of the requests on a request-by-request basis. I/O requests received from a process profiled as persistent may be further processed by the scheduling system as described below, while I/O requests received from a process profiled as non-persistent may be passed on to other scheduling or I/O management components such as an external memory management module, that handle storage of data to non-PM storage devices (e.g., a memory controller for DRAM, a block-based storage controller for SSD or HHD, etc.).

The PM scheduling system may then take the persistent I/O requests and group them to create batches of reads and writes directed to PMEM. For example, each batch may comprise all persistent reads ("read batch") or all persistent writes ("write batch"). Moreover, each batch may be associated with a particular process.

Finally, the PM scheduling system performs optimization to schedule read batches and write batches on assigned memory banks of PMEM structures in order to optimize JCT. Each scheduling time period may be assigned to a particular application, such that only batches from processes of that application are scheduled during that time period. During a given time period associated with a given application, the PM scheduling system may prioritize the read batches from the application over write batches from the application by scheduling any excess read batches before any other batches, where "excess" refers to a number of pending read batches from that application that exceeds the number of pending write batches from that application (e.g., if there are seven (7) read batches and five (5) write batches, then there are two (2) excess read batches). Next, the PM scheduling system may determine an optimal number of read-batches and an optimal number of write-batches, out of the remaining read and write batches from the process to schedule for processing on the PMEM in the remainder of the given scheduling time period. The optimization may be determined by optimizing an objective function that relates job completion time to the number of read batches and number of write batches scheduled in a given time period, in view of factors such as the amount of time read and write processing are expected to take and an amount of time for switching from read processing to write processing and vice versa. The optimization may also be subject to the policy constraints that (1) the time consumed for processing the read and write batches should be proportional to the read and write demand of the application, and (2) the total processing time of read and write batches should not be greater than a bus switching time, which is an amount of time it takes to switch from accessing one PMEM module to accessing another PMEM module. Once the optimal numbers of read batches and write batches have been determined, the PM scheduler may pass the determined numbers of read batches and write batches (e.g., to a memory manager) for commitment to the PMEP. The PM scheduling system may then consider another application in the next scheduling time period, and repeat the same process for the I/O requests thereof. In this manner, I/O requests from the applications can be scheduled in a way that minimizes JCT without artificially excluding write requests and which reflects the read and write needs of the applications. (The terms read and write are used herein to refer to generically to memory accessing instructions/requests related to storing data (write) and retrieving stored data (read), but it should be understood that these instructions/requests could also be referred to by other names in other contexts, such as load and store.)

Turning now to the figures, various devices, systems, and methods in accordance with aspects of the present disclosure will be described.

FIG. 1 is a block diagram illustrating an operating environment for implementing a serverless scheduling platform. It should be understood that FIG. 1 is not intended to illustrate specific shapes, dimensions, or other structural details accurately or to scale, and that implementations of the environment 100 may have different numbers and arrangements of the illustrated components and may also include other parts that are not illustrated.

As shown in FIG. 1, the environment 100 illustrates serverless applications 110 operating in container spaces 120A, 120B, . . . , 120N, where the N may vary based on a number of serverless applications or other factors. The serverless applications 110 send application requests 130 to a serverless scheduling platform 200, to be further described herein. The serverless scheduling platform 200 schedules application requests 130 on a storage layer 150. The storage layer 150 may include, for example PMEM devices 160.

The serverless applications 110 may include, for example, video applications, machine learning inference applications, and sorting analytics applications. The containers 120A . . . 120N partition a machine, or server, into separate user space environments such that each environment runs only one application and does not interact with any other partitioned sections on the machine. Each container 120 shares processing hardware and other infrastructure with other containers.

The serverless scheduling platform 200 includes various components for intelligently scheduling application requests 130. The application requests 130 may include, for example, both read requests and write requests. While some requests may be persistent requests, other requests may be or include non-persistent requests. The serverless scheduling platform 200 receives the application requests 130 and determines an optimal processing for the reads and writes in the requests 130 (e.g., an optimal order of processing the reads/writes and/or an optimal allocation of the reads/writes among the PMEM devices at the storage layer 150). In particular, the serverless scheduling platform 200 intelligently schedules persistent write requests in order to minimize latency, maximize throughput, and optimize JCT. To this end, the scheduling platform 200 may include a PMEM container storage interface (CSI) 202, a memory manager 204 and a PM scheduler 206. The scheduling platform 200 may also include additional components, described in greater detail below in relation to FIG. 2.

The PMEM CSI 202 is configured to support serverless applications by, among other things, providing an interface for the applications to make I/O requests. PMEM CSI 202 are familiar to those of ordinary skill in the art, and thus are not described in detail herein.

The memory manager 204 is configured to manage storage in the storage layer 150 (including, for example, PMEM, as well as other storage devices). The memory manager 204 considers capacity limitations of any available memory devices, deallocating memory space when it is no longer needed. Memory manager 204 strives to optimize memory usage so that the applications can be efficiently executed. The memory manager 204 is familiar to those of ordinary skill in the art, and thus is not described in greater detail herein.

The PM scheduler 206 operates using an application aware I/O scheduling algorithm for serverless applications to improve the utilization of storage resources. The functions of the scheduler 206, including the application aware I/O scheduling algorithm for serverless applications, are described in greater detail below with reference to FIG. 2.

The storage layer 150 may include one or more PMEM devices 160. Each PMEM device 160 comprises one or more PMEM modules or banks, each comprising multiple rows of addressable storage. The storage layer 150 may also include other types of persistent and non-persistent storage. The PMEM device 160 may be or include multiple parallel units. The serverless platform 200 uses the PMEM-devices 160 to process the read and write requests from the serverless applications. In other words, the PMEM 160 store data (in response to write requests) and return data (in response to read requests). In particular, the PMEM 160 may be used to process at least some data that is intended to be persistently stored, while other data that is to be non-persistently stored may be processed by other devices such as random-access memory (RAM). In addition, some data that is intended to be persistently stored but not by PMEM may be processed by other persistent storage devices, such as HDDs or SSDs, which may be part of the storage layer 150 or part of remote devices or systems.

In aspects provided herein, the storage layer 150 may include the PMEM 160 as local storage and may further include one or more remote storage areas. The remote storage areas may be or include, for example, a persistent memory and remote direct memory access (RDMA). RDMA allows direct access from the memory of one computer into that of another without involving either operating system. This permits high-throughput, low-latency networking, which is especially useful in massively parallel computer clusters. The PMEM 160 may be or include DC Persistent Memory (DCPMM). With DCPMM, non-volatile media is placed onto a Dual In-Line Memory Module (DIMM) and installed on the memory bus, traditionally used only for volatile memory Turning now to FIG. 2, a flow diagram illustrates aspects of the serverless scheduling platform 200 of FIG. 1 in greater detail, including a flow within the serverless scheduling platform 200. As noted above, the serverless scheduling platform 200 includes the PM scheduler 206, and in the illustrated example in FIG. 2 the PM scheduler comprises a per-process persistency profiler 210, a read/write batcher 220, and a batch scheduler 230. The scheduling platform 200 also comprises the memory manager 204 as described above (the scheduling platform 200 may also comprise the PMEM CIS 202 described above, but this is omitted from FIG. 2 to simplify the description). As further explained herein, the serverless scheduling platform 200 is responsible for processing and executing the serverless application requests 130 based on their resource requirements. The serverless applications 110 are comprised of multiple functions with many stages (each instantiated by one or more processes of the application), thereby forming function chains. These stages may each generate and consume data, and in particular one stage may consume the data generated by a previous stage as inputs. The stages may, however, have different performance characteristic in terms of their I/O requests, most notably in that some will be more read intensive while others are more write intensive, and some will utilize persistent storage while others utilize non-persistent storage. Hence, each application 110, when executed, performs both many reads and writes.

Figure 2:
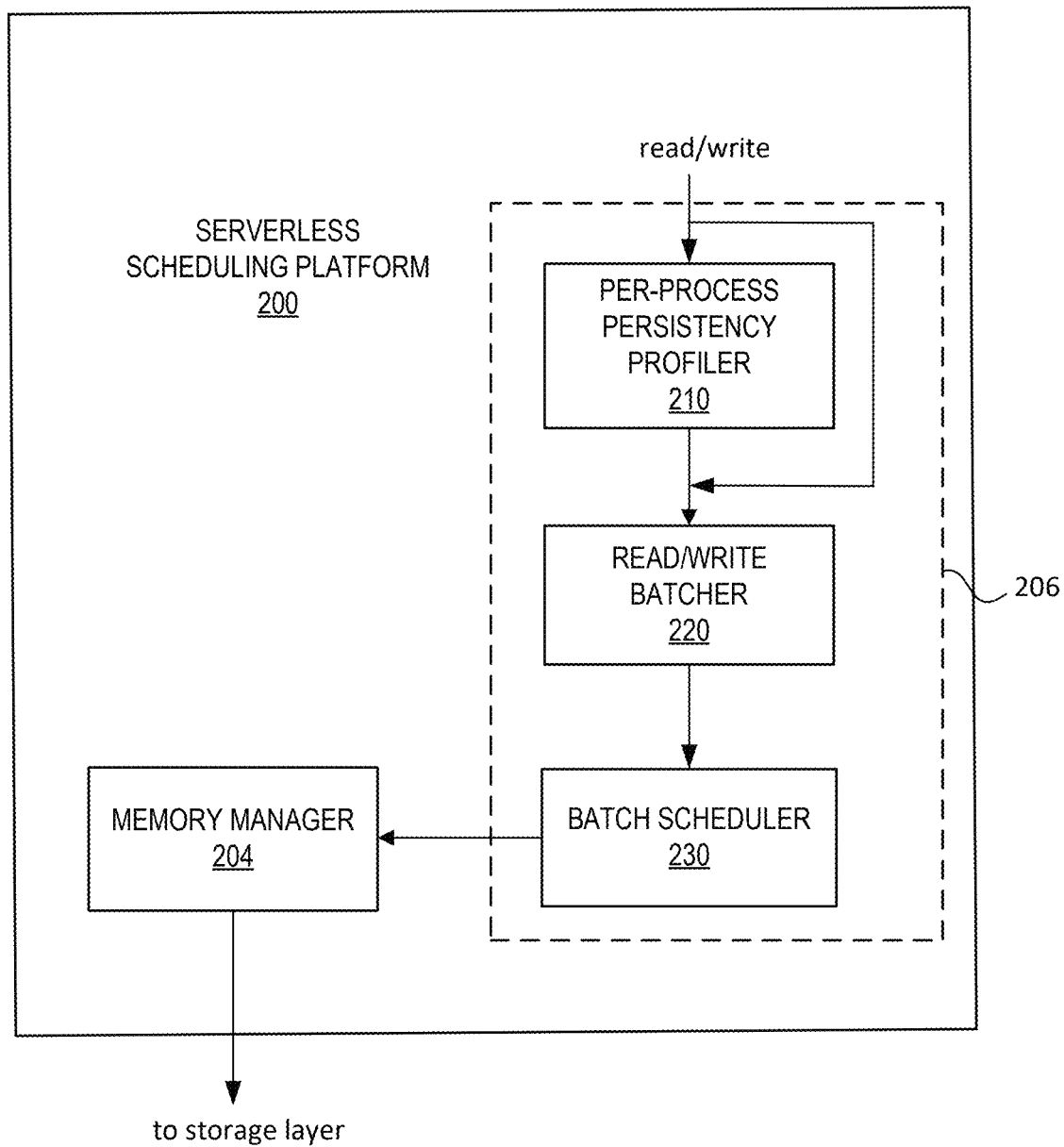
FIG. 2 is a block diagram illustrating flow within a serverless scheduling platform.

Though the PMEM provides many advantages over other memory structures such as SSD and HDD, the performance of PMEM deteriorates with multiple writes by negatively impacting the write bandwidth utilization. Accordingly, the flow shown in FIG. 2 illustrates an intelligent scheduling flow for PMEM-enabled serverless applications to minimize the impact of write bandwidth deterioration.

The per-process persistency profiler 210 receives the application requests 130 and profiles application processes based on the requests. Thus, the per-process persistency profiler 210 is responsible for profiling processes of the serverless applications 110 based on the available application configuration details by determining task level I/O requirements including persistency and throughput. The per-process persistency profiler 210 may, for example, determine whether the application requests 130 of a given process are persistent, i.e., requires PMEM, and if so then the process may be profiled as being persistent and if not, then the process may be profiled as non-persistent. Once a process has been profiled as persistent, thereafter the per-process persistency profiler 210 does not necessarily need to examine each application request 130 from that process to determine if it is persistent, as the per-process persistency profiler 210 can instead sort requests as persistent or not based on which process made the request. The per-process persistency profiler 210 may, in some examples, further determine whether each persistent process is a read-intensive or write-intensive process. In some examples, the per-process persistency profiler 210 may first identify read and write requests and subsequently determine whether the read and write requests are persistent.

Typically, applications 110 running on serverless platforms are decomposed into chains of functions/tasks and the end-to-end functionality of an application 110 can be represented by a Directed Acyclic Graph (DAG), where the nodes of the graph represent individual tasks and the edges represents dependency of the tasks. Thus, the per-process persistency profiler 210 is responsible for ascertaining resource requirements of each task in the DAG. The per-process persistency profiler 210 identifies the persistency state of a process while analyzing the memory access pattern of serverless applications 110.

The read/write batcher 220 is responsible for grouping reads into read batches and writes into write batches. Thus, the read/write batcher 220 ensures that per process read and write batches can be created for assignment to appropriate memory rows. Thus, the read/write batcher 220 categorizes processes according to the I/O characteristics and creates batches of discrete read and write requests, where each batch is formed only for persistent read or for persistent write requests (non-persistent requests having been shunted to other components for processing, as noted above). Further, the read/write batcher 220 forms each batch from a particular process, such that one or more batches is formed for each process. Further, in aspects provided herein, the read/write batcher 220 categorizes applications based on the process profiles to determine whether the submitting applications are read intensive or write intensive. The applications further may be categorized based on characteristics such as memory intensity, bank-level parallelism, and persistence requirements. In some aspects, the read/write batcher 220 may perform batching based on the categorization of an application as read or write intensive.

The batch scheduler 230 collects all the information from the read/write batcher 220 to schedule the read and write batches to the PMEM. The batch scheduler 230 then determines the schedule for the batches, including scheduling the excess read batches first and then determining the optimal number of read batches (P) and write batches (Q) to schedule in the remainder of the time period based on the formulas disclosed herein and subject to the constraints provided herein.

The batch scheduler 230 optimizes bank level parallelism of persistent requests to maximize memory bandwidth. For example, the batch scheduler 230 may schedule consecutively issued groups of write batches in the PMEM by designating them to different PMEM modules. The batch scheduler 230 is configured to minimize write queue latency by intelligently placing the persistent memory requests (i.e., reads and writes) to maximize the overall system performance. To accomplish this objective, the batch scheduler 230 gives priority to read batches among all the batches. For example, when there are more read batches than write batches up for scheduling in a given scheduling time period, the excess read batches (the number of read batches that exceeds that of the write batches) may be scheduled first. Then, from the residual request batches (all read and write batches remaining after the excess read batches have been scheduled), the batch scheduler 230 utilizes an intelligent scheduling policy. The scheduling policy regulates: i) the creation of the set of read and write batches that will be scheduled during the remainder of the scheduling time period (i.e., after the excess read batches, which were given priority) and ii) transitioning between processing the read and write batches.

Further, the batch scheduler 230 performs batch scheduling operations and balances the time consumed in each read and write stream in such a manner that within allotted time constraints, the time allotted is equivalent to the demands of serverless applications. The batch scheduler 230 processes the read and write batches to an appropriate PMEM module. For example, if there are two memory channels and each memory channel has four DCPMM modules attached, the batch scheduler 230 schedules the processes to a particular DCPMM module with the associated thread number in a particular channel. The batch scheduler 230 implements a PMEM-aware policy responsible for placing the persistent write batches and it is fixed by a maximum write bandwidth utilization and ordering control of serverless applications.

The operations of the batch scheduler 230 are described in greater detail below with reference to FIGS. 4 and 5, which disclose methods that the batch scheduler 230 may be configured to perform.

The memory manager 204 may be or include a standard component that manages available memory resources. For example, the memory manager 204 may consider capacity limitations of the memory devices and deallocate memory space when it is no longer needed. The memory manager 204 strives to optimize memory usage so that the applications can be efficiently executed. The memory manager 204 is familiar to those of ordinary skill in the art, and thus is not described in greater detail herein.

Through interaction between the above-identified components, the serverless scheduling platform 200 aims to provide lower job completion time and high throughput for serverless applications.

Figure 3:
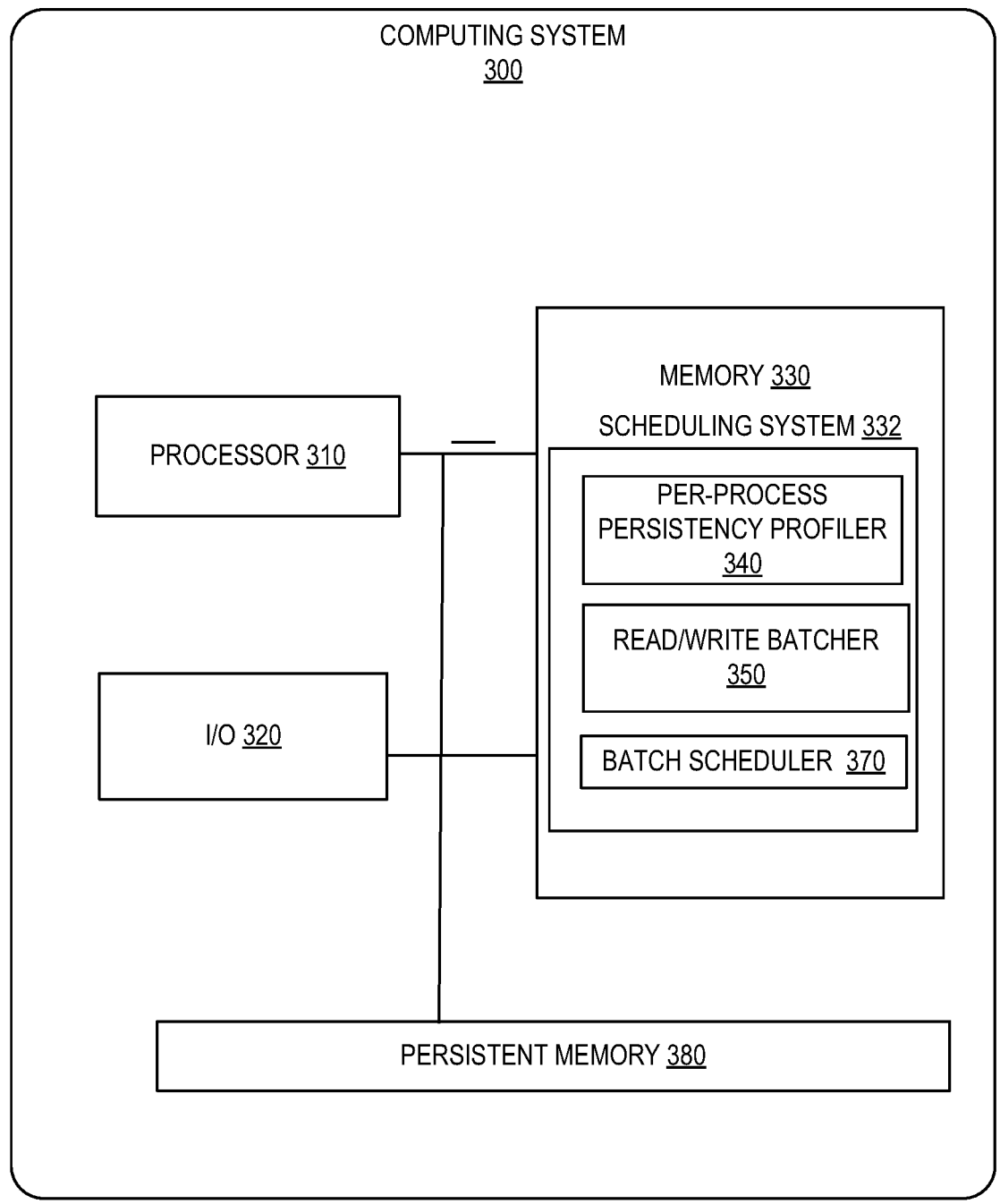
FIG. 3 is a block diagram illustrating a computing system for implementing a serverless scheduling platform in accordance with examples described herein.

FIG. 3 is a block diagram illustrating a computing system 300 for implementing a serverless scheduling platform in accordance with examples described herein The computing system 300 may include, for example, a processor 310, I/O components 320, and a memory 330. The memory 330 may store a scheduling platform or system 332. Further the computing system 300 may include, or may have access to a PMEM 380. All of the illustrated components may be connected by a system bus 312.

The processor 310 may, for example, be in the form of a central processing unit (CPU), a semiconductor-based microprocessor, a digital signal processor (DSP) such as a digital image processing unit, or other hardware devices or processing elements suitable to retrieve and execute instructions stored in a storage medium such as the memory 330. The processor 310 may, for example, include single or multiple cores on a chip, multiple core across multiple chips or devices, or suitable combinations thereof. The processor 310 is configured to fetch, decode, and execute instructions stored in the memory 330 as described herein.

The I/O components 320 are used to transfer information between internal storage and external I/O devices. These may be or include, for example hardware components between the processor 310 and peripherals to supervise and synchronize all the input and output transfers. In examples set forth herein, the I/O components may be implemented to receive application requests and further to schedule I/O tasks on the PMEM 380.

The memory 330 may be or include a non-transitory machine-readable storage medium. The memory 330 may be or include a storage drive, flash memory, random access memory (RAM), any type of storage disc, or a combination thereof. In some examples, the memory 330 may correspond to a main memory where software may reside during runtime, and secondary memory. The secondary memory may include, for example, a non-volatile memory where a copy of software or other data is stored.

The scheduling system 332 may include a per-process persistency profiler 340, a read/write batcher 350, and a batch scheduler 370. These components function within the computing environment shown in FIGS. 1 and 2 above, and function substantially in the manner as the similarly named components described with reference to FIG. 2 above. That is, the per-process persistency profiler 340, a read/write batcher 350, and a batch scheduler 370 may be configurations or examples of the per-process persistency profiler 210, read/write batcher 220, and batch scheduler 230, respectively, which were described above. These components may be embodied as instructions that are stored on the memory 330 and are executable by the processor 310 to implement their corresponding functionalities. In some examples, the memory 330 may include additional instructions to implement the functionalities described herein. Further, any one or more of these instructions sets may be implemented in the form of electronic circuitry, in the form of executable instructions encoded on a machine readable storage medium, or a combination thereof. In cases in which the processing circuitry includes dedicated hardware, in addition to or in lieu of the processor, the dedicated hardware may include any electronic device that is configured to perform specific operations, such as an Application Specific Integrated Circuit (ASIC), a Field Programmable Gate Array (FPGA), a Complex Programmable Logic Device (CPLD), discrete logic circuits, a hardware accelerator, a hardware encoder, etc. The processing circuitry may also include any combination of dedicated hardware and processor plus software.

Figure 4:
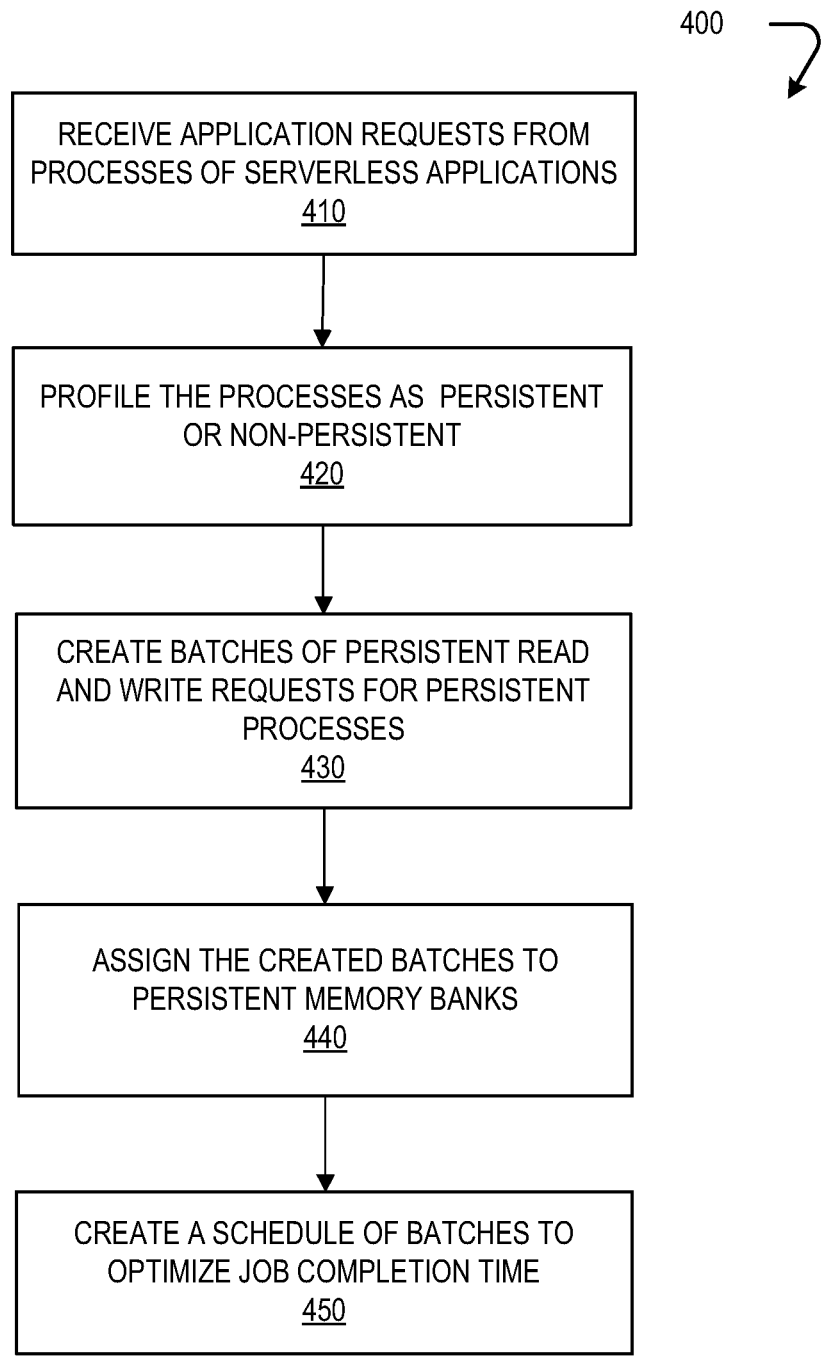
FIG. 4 is a flow diagram illustrating a method for scheduling requests from serverless applications in persistent memory.

FIG. 4 is a flow diagram illustrating a method 400 for scheduling requests from serverless applications in persistent memory. Method 400 may be performed by any suitable processor discussed herein, for example, a processor included in a cloud or in a serverless application infrastructure. For discussion purposes, as an example, method 400 is described as being performed by the processor 310 included in a computing system 300. In addition, the method 400 may be performed by the PM scheduler 206 or components thereof, as illustrated in FIGS. 1 and 2. In particular, in some examples the PM scheduler 206 or components thereof are instantiated by one or more processors executing machine readable instructions that comprise, at least in part, instructions corresponding to the operations of method 400. The method 400 may also be performed by one or more of the per-process persistency profiler 340, read/write batcher 350, and batch scheduler 370, as illustrated in FIG. 3. In particular, in some examples one or more of the per-process persistency profiler 340, the read/write batcher 350, and the batch scheduler 370 are instantiated by one or more processors executing machine readable instructions that comprise, at least in part, instructions corresponding to the operations of method 400.

Method 400 starts in step 410, in which the processor 310 may receive application requests from processes of serverless applications. In step 420, the processor 310 utilizes per-process persistency profiling to obtain resource requirements of each process in the application DAG. The processor 310 profiles each of the application processes over a time period through its per-process persistency profiling as persistent or non-persistent processes. In other words, the per-process persistency profiling identifies whether or not a process uses persistent memory or not, thereby identifying PMEM-related processes and non-PMEM related processes.

The processor 310, during profiling, detects if a process needs to utilize PMEM or not. This may be accomplished, for example, by exploiting program clues to understand if a processes requires a persistent write operation. Program clues may, for example, include examining lower level kernel system calls or examining user space information at the application layer to determine task level I/O requirements including persistency and throughput, and whether an application's I/O workload requires PMEM. The profiling of write processes as persistent or non-persistent ensures that the non-persistent writes need not to be profiled as persistent writes.

In some aspects, if the number of write threads within an application process exceeds or meets a predetermined threshold, the processor 310 may classify the process as persistent or PMEM-related. The predetermined threshold can be determined based on the bandwidth utilization of the PMEM while varying the number of write threads. The threshold may be set, as an example, to four write threads if the write bandwidth decreases significantly when more than four write threads are included. Thus, the processor 310 identifies the persistency state, while analyzing a memory access pattern of serverless applications.

In step 430, once the task level processes are profiled, the processor 310 creates batches of the persistent requests for scheduling on the PMEM. In aspects described herein, the processor 310 creates batches of the persistent requests after profiling the processes of the requests according to I/O characteristics. An objective of read/write request batching is to classify the group of requests to the DCPMM modules (i.e., memory rows) from like processes. Here, the batches are formed per process in terms of reads and writes.

In step 440, once the read batches and write batches are created, the processor 310 assigns the read and write batches to appropriate memory banks in order to avoid interleaving. When the processes are scheduled successively, the requests for a read or write batch (excluding the initial batch) will go to the same row buffer, thus reducing the impact of request interleaving and improving latency and throughput.

Finally, in step 450, the processor 310 creates a schedule of read and write batches to optimize JCT. The processor 310 optimizes bank-level parallelism of persistent requests to maximize the memory bandwidth. The processor 310 shields consecutively issued groups of write batches in persistent memory. For example, the processor designates the consecutively issued write batches to different DCPMM modules. An objective of the PM-aware scheduler is to minimize write queue latency by intelligently placing the persistent memory requests (i.e., reads and writes) to maximize overall system performance. To optimize overall system performance, the processor 310 prioritizes read batches among all the batches by first scheduling excess read batches (if any) as described above. From the remaining request batches, the processor 310 implements an intelligent scheduling policy which regulates transition between processing the read and write batches. To ensure the fairness, the processor 310 balances the time consumed in each read and write stream in such a manner that the time consumed is proportional to the demands of serverless applications, thereby ensuring that latency in each stream is adequate and that total latency is minimized.

Figure 5:
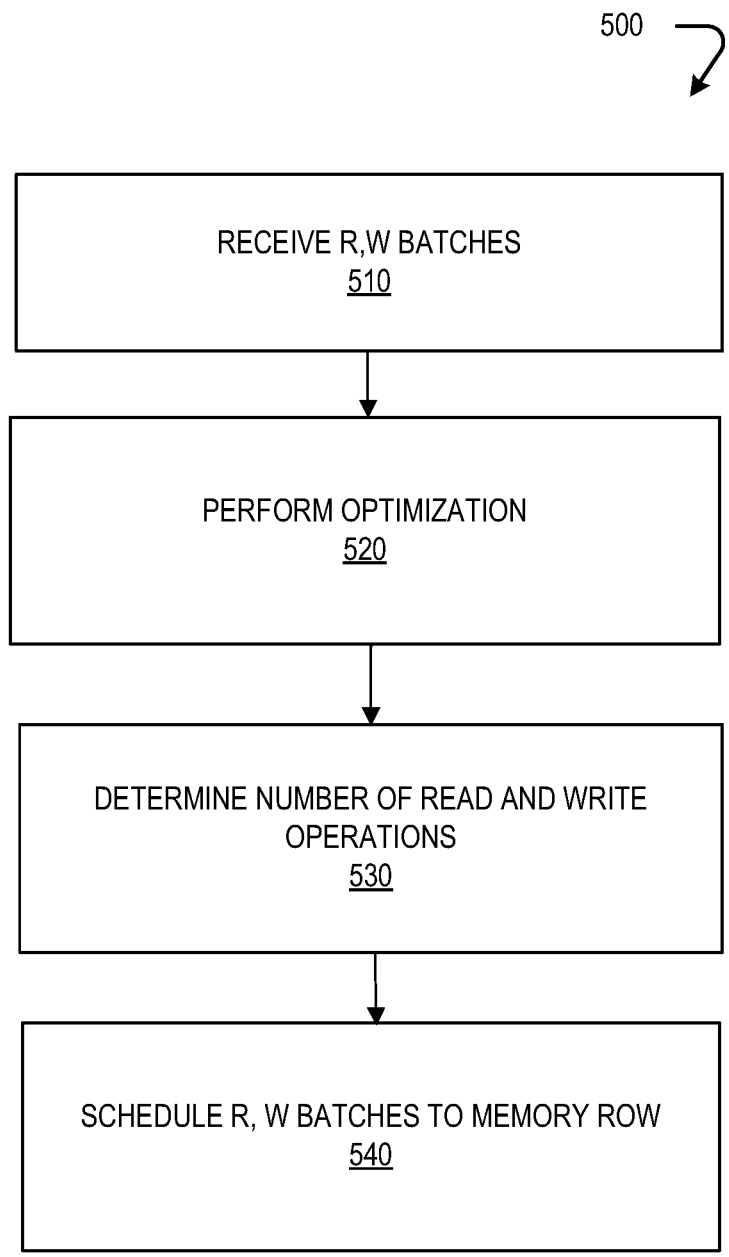
FIG. 5 is a flow diagram illustrating a method performed by a batch scheduler of the scheduling platform in accordance with examples set forth herein.

FIG. 5 depicts an exemplary method 500 for creating the schedule of batches for optimizing JCT. Method 500 may be performed by any suitable processor discussed herein. For discussion purposes, as an example, method 500 is described as being performed by the processor 310. As explained above, the processor 310 processes the read and write batches to an appropriate location in PMEM, for example, a particular DCPMM module. In addition, the method 500 may be performed by the PM scheduler 206 or components thereof, as illustrated in FIGS. 1 and 2. In particular, in some examples the PM scheduler 206 or components thereof are instantiated by one or more processors executing machine readable instructions that comprise, at least in part, instructions corresponding to the operations of method 500. The method 500 may also be performed by one or more of the per-process persistency profiler 340, read/write batcher 350, and batch scheduler 370, as illustrated in FIG. 3. In particular, in some examples one or more of the per-process persistency profiler 340, the read/write batcher 350, and the batch scheduler 370 are instantiated by one or more processors executing machine readable instructions that comprise, at least in part, instructions corresponding to the operations of method 500.

Method 600 starts in step 510, in which the processor 310 may receive the read and write batches formed based on processing of application requests from the serverless applications. As set forth above, this may be accomplished through the use of a per-process persistency profiler and read/write batcher.

In step 520, the processor 310 performs optimization. To optimize the JCT of each application processes, the processor 310 implements a scheduling policy for processing the persistent reads and persistent writes within a time period. It enforces the policy in a round-robin manner among the application processes (i.e., the batches of one process are scheduled per scheduling time period) based on their demands while considering the total memory bandwidth of the PMEM. To limit the frequent bus switching latency, which is an amount of time it takes to switch from accessing one PMEM module to accessing another PMEM module, the processor 310 schedules the set of batches to a same memory having enough memory bandwidth before scheduling a separate group of batches in the next time period. Further, in step 530, the processor 310 determines a number of read and write operations and in step 540, the processor 310 schedules the read and write batches to the persistent memory banks.

To achieve these goals and in accordance with the optimization policy implemented by the processor 310, the time consumed for processing the read and write sets should be proportional to the read/write demand of the serverless applications and the total processing time of read and write batches should not be greater than the bus switching time.

The scheduling policy incorporates two inequalities:

$$T_{r,t}^i / T_{w,t}^i < T_r^{max} / T_w^{max} \quad (1a)$$

$$(T^i_{r w,r,t} + T^i_{w,r,t})/(T_{r,t}^i + T_{w,t}^i) \leq \eta \quad (1b)$$

where $T_{r,t}^i$ and $T_{w,t}^i$ denote the processing time of read and write batches in time slot t and $T_r^{max}$ and $T_w^{max}$ denote the maximum processing time of read and write requests for an application request i among all time slots and $\eta$ denotes the threshold bus switching time while considering the cumulative processing time of memory requests. $T^i_{r w,t}$ and $T^i_{w,r,t}$ denote the read-to-write and write-to-read switching latency for application request i in time slot t.

Accordingly, the processor 310 schedules a set of read and write batches for processing in the next time slot t in a way that assures the inequalities introduced above in equations (1 a) and (1b).

Thereafter, the processor 310 selects the set of possible read and write batches (i.e., $T''_{r,t}$ and $T''_{w,t}$) following the constraints set forth below in equations 2a and 2b:

$$T''_{r,t} = T_{r,t}^i, \text{ where } T_{r,t}^i = (T^i_{r w,t} + T^i_{w,r,t})/\eta(T_r^{max}/T_w^{max}) \quad (2a)$$

$$T''_{w,t} = T_{w,t}^i, \text{ where } T_{w,t}^i = (T^i_{r w,t} + T^i_{w,r,t})/\eta(T_w^{max}/T_r^{max}) \quad (2b)$$

Based on the above-mentioned constraints, the processor minimizes the JCT of serverless applications accessing PMEM. The JCT for an application request i is defined as:

$$JCT_i = \left(\sum_t p_t T^i_{r,t} + \sum_t q_t T^i_{w,t}\right) + \mathcal{E}_i + \mathcal{G}_i \quad (3)$$

where $p_t$ and $q_t$ denote respectively the number of reads and writes scheduled in time slot t, $p = \Sigma_t pt$ and $q = \Sigma_t qt$ denote the total number of reads and writes performed by an application i. $\mathcal{E}_i$ and $\mathcal{G}_i$ denote the execution time and processing time of an application i at the serverless platform. Therefore, the optimization is expressed as follows:

$$\min_{i \in P} JCT_i, \quad (4)$$

$$s.t. (\tau_{rw,t}^i + \tau_{wr,t}^i)/(\tau_{r,t}^i + \tau_{w,t}^i) > \eta \quad (5)$$

$$\mathcal{J} \geq \mathcal{J}_{th} \quad (6)$$

$$\gamma_i \geq SLA, i \in P \quad (7)$$

$$\tau_{r,t}^n = \tau_{r,t}^i \text{ and } \tau_{w,t}^n = \tau_{w,t}^i \quad (8)$$

where $JCT_i$ is the JCT of the request i, where $i \in 1, \ldots, P$ and P is the total number of requests from an application. $\mathcal{J}_i$ and $\mathcal{J}_{th}$ denote the fairness index or a request and the threshold fairness index. $\gamma_i$ is the service level agreement (SLA) of the application i and $\gamma_i$ should be greater than a threshold SLA.

In examples set forth herein, Jain's fairness index can be utilized and is expressed as follows:

$$\mathcal{J}_i = \frac{\left(\sum_t p_t T^i_{r,t} + \sum_t q_t T^i_{w,t}\right)^2}{\left(p \cdot \sum_t (p_t T^i_{r,t})^2 + q \cdot \sum_t (q_t T^i_{w,t})^2\right)} \quad (9)$$

In examples set forth herein the scheduling policy based on the equations as set forth above is illustrated in Table 1 below:

TABLE 1

| | |
|---|---|
| 1: | Inputs: $\tau_{rw,t}^i$, $\tau_{wr,t}^i$ and $\eta$. |
| 2: | Outputs: $\tau_{r,t}^n$, $\tau_{w,t}^n$, and $JCT_i$. |
| 3: | Set p and q, where $H^r$ and $H^w$ denote the total number of read and write batches. |
| 4: | for i = 0 to p do |
| 5: |    Determine $\tau_{r,t}^n$ using Eq. 2. |
| 6: | for i = 0 to q do |
| 7: |    Determine $\tau_{w,t}^n$ using Eq. 2. |
| 8: | Calculate $JCT_i$ using Eq. 3. |
| 9: | Get optimize JCT the optimization problem in Eq. 4. |
| 10: | end procedure |

Thus, to optimize the JCT of each application process, the scheduling platform described herein processes the reads and persistent writes within a time period. It enforces the above-described scheduling policy in a round-robin manner among the application processes based on their demands while considering the total memory bandwidth of PMEM. To limit the frequent bus switching latency, which is an amount of time it takes to switch from accessing one PMEM module to accessing another PMEM module, the scheduling platform schedules the set of batches to a same memory having enough memory bandwidth before scheduling a separate group of batches in the next time period and determines the actual sequence of reads/writes in a batch. The scheduling platform is constrained by the maximum write bandwidth utilization and ordering control of serverless applications. In addition to prioritizing the requests in the scheduling policy, the scheduling platform determines when to switch between write and read operations.

As an example, in one scenario, the scheduling platform may find that it needs to process ten reads and ten writes for an application and that it can schedule only two read batches and two write batches in a time slot. This example assumes knowledge of switching latencies and processing times.

Using these assumptions and the equations provided above, the JCT can be computed. Initially, the application request schedules two read requests and it takes (2*2)=4 units of time, where the one read requires, for example, two (2) units of time. Next, to enforce fairness, the scheduling platform schedules two (2) writes in the next batch and it will take $$T_{w,t}^i = \frac{4+0}{0.5(10/5)} = 4$$

units of time, where $n = 0.5$, $T_{r\bar{w},t}^i = 4$, $T_{\bar{w}r.t}^i = 0$, and $T_w^{max} = 10$ and $T_r^{max} = 5$ respectively. Therefore, the total latency incurred by two (2) writes would be (4*2)=8 units of time. Similarly, the latency incurred by remaining eight (8) reads and writes would be (8*2+8*4). Hence, the total JCT would be JCT=(4+8+8*2+8*4+1+5)=66 units, where the processing time is 1 units and execution time is 5 units.

As another example, the scheduling platform again finds it needs to process ten (10) write operations and ten (10) read operations. This example assumes knowledge of switching latencies and processing times Using these assumptions and the equations provided above, the JCT can be computed. In this instance, the scheduling platform implements a policy allowing four (4) read batches and three (3) write batches in a time slot. Initially, the application request schedules 4 read requests and it takes 2*4=8 units of time, where the one read requires, for example, two (2) units of time. Next, to enforce fairness, the scheduling platform schedules three (3) writes in the next batch and it will take $$T_{w,t}^i = \frac{6+0}{0.5(12/8)} \approx 8$$

units of time, where $n = 0.5$, $T_{r\bar{w},t}^i = 6$, $T_{\bar{w}r.t}^i = 0$, and $T_w^{max} = 12$ and $T_r^{max} = 8$ respectively. Therefore, the total latency incurred by three (3) writes would be (8*3)=24 units of time. Similarly, the latency incurred by remaining six (6) reads would be (6*2). On the other hand, among the seven (7) remaining writes, six (6) writes would need to change the bus and one (10 write would not need to change the bus, hence the latency incurred by remaining writes would be (6*8+1*3), where the write (without any bus switch) would take three (3) units of time. Hence, the total JCT would be JCT=(8+24+6*2+6*8+3*1+2+6)=103 units, where the processing time is 2 units and execution time is 6 units. Thus, a goal of the scheduling platform is to find optimized JCT based on the given parameters in the optimization problem set forth in equation (4) above. Further, the optimal values of p and q that result in a minimum JCT can be computed.

The methods, systems, devices, and equipment described herein may be implemented with, contain, or be executed by one or more computer systems. The methods described above may also be stored on a non-transitory computer readable medium. Many of the elements may be, comprise, or include computers systems.

It is to be understood that both the general description and the detailed description provide examples that are explanatory in nature and are intended to provide an understanding of the present disclosure without limiting the scope of the present disclosure. Various mechanical, compositional, structural, electronic, and operational changes may be made without departing from the scope of this description and the claims. In some instances, well-known circuits, structures, and techniques have not been shown or described in detail in order not to obscure the examples. Like numbers in two or more figures represent the same or similar elements.

In addition, the singular forms "a", "an", and "the" are intended to include the plural forms as well, unless the context indicates otherwise. Moreover, the terms "comprises", "comprising", "includes", and the like specify the presence of stated features, steps, operations, elements, and/or components but do not preclude the presence or addition of one or more other features, steps, operations, elements, components, and/or groups. Components described as coupled may be electronically or mechanically directly coupled, or they may be indirectly coupled via one or more intermediate components, unless specifically noted otherwise. Mathematical and geometric terms are not necessarily intended to be used in accordance with their strict definitions unless the context of the description indicates otherwise, because a person having ordinary skill in the art would understand that, for example, a substantially similar element that functions in a substantially similar way could easily fall within the scope of a descriptive term even though the term also has a strict definition.

Elements and their associated aspects that are described in detail with reference to one example may, whenever practical, be included in other examples in which they are not specifically shown or described. For example, if an element is described in detail with reference to one example and is not described with reference to a second example, the element may nevertheless be claimed as included in the second example.

Further modifications and alternative examples will be apparent to those of ordinary skill in the art in view of the disclosure herein. For example, the devices and methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various examples shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the scope of the present teachings and following claims.

It is to be understood that the particular examples set forth herein are non-limiting, and modifications to structure, dimensions, materials, and methodologies may be made without departing from the scope of the present teachings.

Other examples in accordance with the present disclosure will be apparent to those skilled in the art from consideration of the specification and practice of the invention disclosed herein. It is intended that the specification and examples be considered as exemplary only, with the following claims being entitled to their fullest breadth, including equivalents, under the applicable law.

What is claimed is:

1. A system comprising:
   a processor; and
   a non-transitory storage medium storing instructions executable on the processor to:
   receive application requests including read and write requests from processes of a serverless application;

profile the processes of the serverless application as one of persistent processes that issue input/output (I/O) requests to persistent memory;

create batches of the application requests including read batches of the read requests and write batches of the write requests for the persistent processes;

identify a number of excess read batches based on comparing a quantity of the read batches to a quantity of the write batches;

schedule the excess read batches first to the persistent memory before a remainder of the read batches and the write batches, the remainder of the read batches excluding the excess read batches; and schedule the remainder of the read batches and the write batches to the persistent memory based on an objective function relating to a completion time.

2. The system of claim 1, wherein the scheduling of the read requests and the write requests from the persistent processes is performed by a first scheduler, and the instructions are executable on the processor to:

profile further processes of the serverless application as non-persistent processes that issue I/O requests to non-persistent memory; and pass further requests of the non-persistent processes to a second scheduler different from the first scheduler.

3. The system of claim 1, wherein the instructions are executable on the processor to:

profile the processes of the serverless application as the persistent processes based on determining that a quantity of write requests in a write batch of write requests exceeds a quantity threshold.

4. The system of claim 1, wherein the number of excess read batches is a quantity of the read batches that exceeds the quantity of the write batches.

5. The system of claim 1, wherein the instructions are executable on the processor to:

profile the processes of the serverless application as the persistent processes based on examining kernel system calls in the system.

6. The system of claim 1, wherein the scheduling of the remainder of the read batches and the write batches is according to a time constraint specifying that processing times consumed for the remainder of the read batches and the write batches are proportional to read and write demands of the serverless application.

7. The system of claim 1, wherein the instructions are executable on the processor to:

implement a fairness algorithm balancing time consumed on the read requests and the write requests for the persistent processes.

8. The system of claim 1, wherein the objective function seeks to reduce bus switching latency due to switching between different persistent memories.

9. The system of claim 1, wherein the objective function is further based on a read-to-write latency and a write-to-read latency.

10. The system of claim 1, wherein the instructions are executable on the processor to:

profile the processes of the serverless application as the persistent processes based on an I/O workload requirement of the serverless application.

11. A method comprising:

receiving, at a system comprising a hardware processor, application requests from processes of a serverless application, the application requests including read requests and write requests;

profiling, by the system, the processes of the serverless application as persistent processes that issue input/output (I/O) requests to persistent memory;

creating, by the system, batches of the application requests including read batches of the read requests and write batches of the write requests for the persistent processes;

identifying, by the system, a number of excess read batches based on comparing a quantity of the read batches to a quantity of the write batches;

scheduling, by the system, the excess read batches first to the persistent memory before a remainder of the read batches and the write batches, the remainder of the read batches excluding the excess read batches; and scheduling, by the system, the remainder of the read batches and the write batches to the persistent memory based on an objective function relating to a completion time.

12. The method of claim 11, wherein the scheduling of the read requests and the write requests from the persistent processes is performed by a first scheduler, and the method further comprises:

profiling, by the system, further processes of the serverless application as non-persistent processes that issue I/O requests to non-persistent memory; and passing, by the system, further requests of the non-persistent processes to a second scheduler different from the first scheduler.

13. The method of claim 11, wherein the profiling comprises profiling the processes of the serverless application as the persistent processes based on determining that a quantity of write requests in a write batch of write requests exceeds a quantity threshold.

14. The method of claim 11, wherein the number of excess read batches is a quantity of the read batches that exceeds the quantity of the write batches.

15. The method of claim 11, wherein the profiling comprises profiling the processes of the serverless application as the persistent processes based on examining kernel system calls in the system.

16. The method of claim 11, wherein the scheduling of the remainder of the read batches and the write batches is according to a time constraint specifying that times consumed for processing the read batches and the write batches are proportional to read and write demands of the serverless application.

17. The method of claim 11, further comprising implementing a fairness algorithm balancing time consumed on the read requests and the write requests for the persistent processes.

18. The method of claim 11, wherein the objective function seeks to reduce bus switching latency due to switching between different persistent memories.

19. A non-transitory computer-readable medium comprising instructions that upon execution cause a system:

receive application requests including read requests and write requests from processes of a serverless application;

profile the processes of the serverless application as persistent processes that issue input/output (I/O) requests to persistent memory;

create batches of the application requests including read batches of the read requests and write batches of the write requests for the persistent processes;

identify a number of excess read batches based on comparing a quantity of the read batches to a quantity of the write batches;

schedule the excess read batches first to the persistent memory before a remainder of the read batches and the write batches, the remainder of the read batches excluding the excess read batches; and schedule the remainder of the read batches and the write batches to the persistent memory based on an objective function relating to a completion time.

20. The non-transitory computer-readable medium of claim 19, wherein the profiling comprises profiling the processes of the serverless application as the persistent processes based on examining kernel system calls in the system.

\* \* \* \* \*